United States Patent
Sonnenfeld

(10) Patent No.: US 10,287,114 B2
(45) Date of Patent: May 14, 2019

(54) METHODS, SYSTEMS AND APPARATUSES FOR LOADING AND UNLOADING FREIGHT FROM RAILCARS

(71) Applicant: Nathan J. Sonnenfeld, New York, NY (US)

(72) Inventor: Nathan J. Sonnenfeld, New York, NY (US)

(73) Assignee: Nathan J. Sonnenfeld, New York, NY (US)

( * ) Notice: Subject to any disclaimer, the term of this patent is extended or adjusted under 35 U.S.C. 154(b) by 0 days.

(21) Appl. No.: 14/167,776

(22) Filed: Jan. 29, 2014

(65) Prior Publication Data

US 2014/0212251 A1     Jul. 31, 2014

Related U.S. Application Data

(60) Provisional application No. 61/758,529, filed on Jan. 30, 2013.

(51) Int. Cl.
*B65G 63/02* (2006.01)

(52) U.S. Cl.
CPC .................................. *B65G 63/025* (2013.01)

(58) Field of Classification Search
CPC .... B60P 1/6436; B65G 63/025; B61D 47/005
USPC ................. 414/392, 395, 398, 400
See application file for complete search history.

(56) References Cited

U.S. PATENT DOCUMENTS

| | | | | |
|---|---|---|---|---|
| 2,121,181 A * | 6/1938 | Bayerl | ................... | B61D 3/184 105/159 |
| 3,576,167 A * | 4/1971 | Macomber | ........... | B61D 45/005 105/159 |
| 4,425,064 A | 1/1984 | Walda et al. | | |
| 4,522,546 A * | 6/1985 | Ringer | ................ | B65G 63/025 104/48 |
| 4,543,027 A * | 9/1985 | Jones | ..................... | B65G 67/20 104/29 |
| 6,302,635 B1 * | 10/2001 | Kolker | .................. | B60P 1/6436 414/333 |
| 8,800,452 B2 * | 8/2014 | Kun | ....................... | B61D 3/184 104/130.01 |
| 2004/0213652 A1 * | 10/2004 | Campbell | ............ | B65G 63/002 414/398 |
| 2005/0102813 A1 * | 5/2005 | Boettcher | ............ | B65G 63/025 29/428 |
| 2012/0308352 A1 * | 12/2012 | Jensen | ..................... | B61D 3/20 414/509 |

FOREIGN PATENT DOCUMENTS

EP       0453537 B1       2/1995
EP       0776291 B1 *     4/1998    ............. B61D 47/00

* cited by examiner

*Primary Examiner* — Mark C Hageman
(74) *Attorney, Agent, or Firm* — Kenneth H. Sonnenfeld; King & Spalding LLP

(57) ABSTRACT

The invention described herein provides methods, systems and apparatuses for loading and unloading freight from railcars and methods for intermodal transportation of freight on railcars. The freight may be a shipping container or a semi-trailer. The system for loading and unloading freight on railcars includes a sled capable of moving laterally between a loading location and a railcar.

6 Claims, 8 Drawing Sheets

METHODS, SYSTEMS AND APPARATUSES FOR LOADING AND UNLOADING FREIGHT FROM RAILCARS

This application is a non-provisional of U.S. Provisional Application No. 61/758,529, filed Jan. 30, 2013, which is hereby incorporated by reference in its entirety.

FIELD OF INVENTION

The invention relates generally to intermodal transportation of freight, in particular the loading and unloading of freight from road to rail and vice versa.

BACKGROUND OF THE INVENTION

The interchange of freight from one mode of transportation to another, e.g., from road to rail and vice versa, is costly and logistically tedious. The advent of intermodal containers has simplified the process since they are designed to move freight from one mode of transport to another without unloading and reloading the contents of the container. In common use are semi-trucks suitable for transporting intermodal containers via semi-trailers. Railcars suitable for transporting semi-trailers have been developed and are generally known as articulated flat cars. A simple method of transporting semi-trailers over rail is simply by "piggy backing" or loading the semi-trailers onto flat bed railcars.

Articulated flat cars can differ from conventional railcars in a variety of ways, e.g., in not being as heavily constructed since the semi-trailer loads are relatively light compared to loaded box cars, in having different forms of connectors between cars, and often in being constructed at each end so as to form a continuous pathway from car-to-car for circus style loading of semi-trailers. In circus style loading, semi-trailers are attached to a yard tractor or hostler and backed onto a first railcar and then along a series of articulated cars until reaching a final position.

Conventional loading and unloading of semi-trailers individually and sequentially from flat bed railcars occurs by lifting them each by crane and moving them to a desired location, on or off the flatbed railcar. This Lift On-Lift Off procedure of special liftable semi-trailers is achieved by expensive travelling gantry cranes or by expensive heavy-duty lift trucks loading and/or unloading liftable semi-trailers one-at-a-time along the length of the train.

In recent years a variety of systems for non-lifting road to rail horizontal interchanges of semi-trailers have been promoted. One system of interchanging standard semi-trailers between road and rail requires a very complex in-terminal mechanism to unlock a single railcar from within a train and to rotate the disconnected section across the railway to permit a semi-truck to enter/exit diagonally onto or off of the railcar. An alternative method has been proposed to perform the elevation and rotation of moveable railcar floors of railcars in the manner detailed in European Patent No. 0 453 537 whereby standard non-liftable semi-trailers are loaded on and unloaded from railcars by Roll On-Roll Off mode. In this instance, a rail freight terminal is equipped with a series of 'Pop-Up' mechanisms secured centrally between the rails of railway foundations, powered to raise; rotate, and lower the underside of moveable wellfloors to rest on the platform edges diagonally across the railway. This method requires the coordination of the wellfloor properly positioning the arriving semi-trailer with the waiting tractor on one side of the railway, and alignment with departing tractor and departing semi-trailer on the opposite side of the railway.

It is therefore desirable to provide improvement in the efficiency of loading and unloading freight from railcars.

SUMMARY OF INVENTION

The inventive system for loading and unloading freight and that provide a simple, cost effective and efficient method for intermodal transportation of freight on railcars that does not require simultaneous orchestrating of departing or arriving tractors with train arrival. For example, the inventive system allows tractor hauled freight to be dropped off at a preassigned loading location for future road to rail interchange, i.e., loading onto a railcar. Also, a railcar can be unloaded into a predetermined loading location for future rail to rail interchange or rail to road interchange.

The invention described herein provides methods, systems and apparatuses for loading and unloading freight from railcars. An embodiment of the invention comprises a system for loading and unloading freight on railcars, the system includes a sled capable of moving laterally between a loading location and a railcar where the surfaces of the loading location and an aligned railcar are at substantially the same elevation. The sled is capable of securing the freight and of being secured to the railcar. In a particular embodiment, the railcar is a conventional flatbed railcar. In another embodiment, the freight is a container, such as a shipping container or intermodal container. In a preferred embodiment, the freight is a trailer that includes a container, for example, a flatbed trailer or a semi-trailer.

In another embodiment, the system includes a staging zone made up of a plurality of loading locations. In a particular embodiment, the system includes a second staging zone, e.g., on the opposite side of a railway with respect to a first staging zone.

In another embodiment, a plurality of loading locations are positioned serially within a staging zone. The loading locations optionally include corresponding sleds. Movement of the sleds may be achieved individually, serially, or together to achieve highly efficient loading or unloading of freight to or from a plurality of railcars.

In one embodiment the railcar is specially adapted to accommodate and secure the sled. In another embodiment, the sled is specially adapted to accommodate and secure the railcar. Optionally, the sled is specially adapted to secure the freight.

In an embodiment of the invention the system comprises a mechanism for laterally moving the sled between the loading location and the railcar. In some embodiments, lateral movement includes rotation of the sled. In one embodiment, the sled includes a mechanism that permits the lateral movement of the sled. In an alternative embodiment, the loading location and/or the railcar include a mechanism that permits lateral movement of the sled. If the mechanism is located in the railcar or in the loading location then such a mechanism would also include a device for attending to the sled to effect its movement.

Another aspect of the invention is directed to a method for intermodal transportation of freight on railcars including the steps of placing freight on a sled capable of moving laterally between a loading location and an aligned railcar that are substantially at the same elevation, laterally moving the sled and freight from a first loading location to a first railcar. In a further embodiment, the method includes the step of laterally moving the sled and freight from the first railcar to a second loading location.

In a further embodiment, a plurality of sleds and freight are moved from loading locations to railcars or from railcars to loading locations either individually, in series or substantially at the same time, i.e., simultaneously.

In some embodiments, the method optionally includes the steps of transporting a railcar with the freight and sled to a destination having one or more empty loading locations.

In an embodiment, the transported freight is transferred to a tractor from a loading location for further transportation by road; the method includes the steps of releasing the freight from the sled, and transferring the freight onto a tractor and hauling the freight by road to a subsequent or final destination.

DETAILED DESCRIPTION

In the following description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details herein. Moreover, descriptions of well-known devices, methods and materials may be omitted so as to not obscure the description of the present invention.

Figure 1:
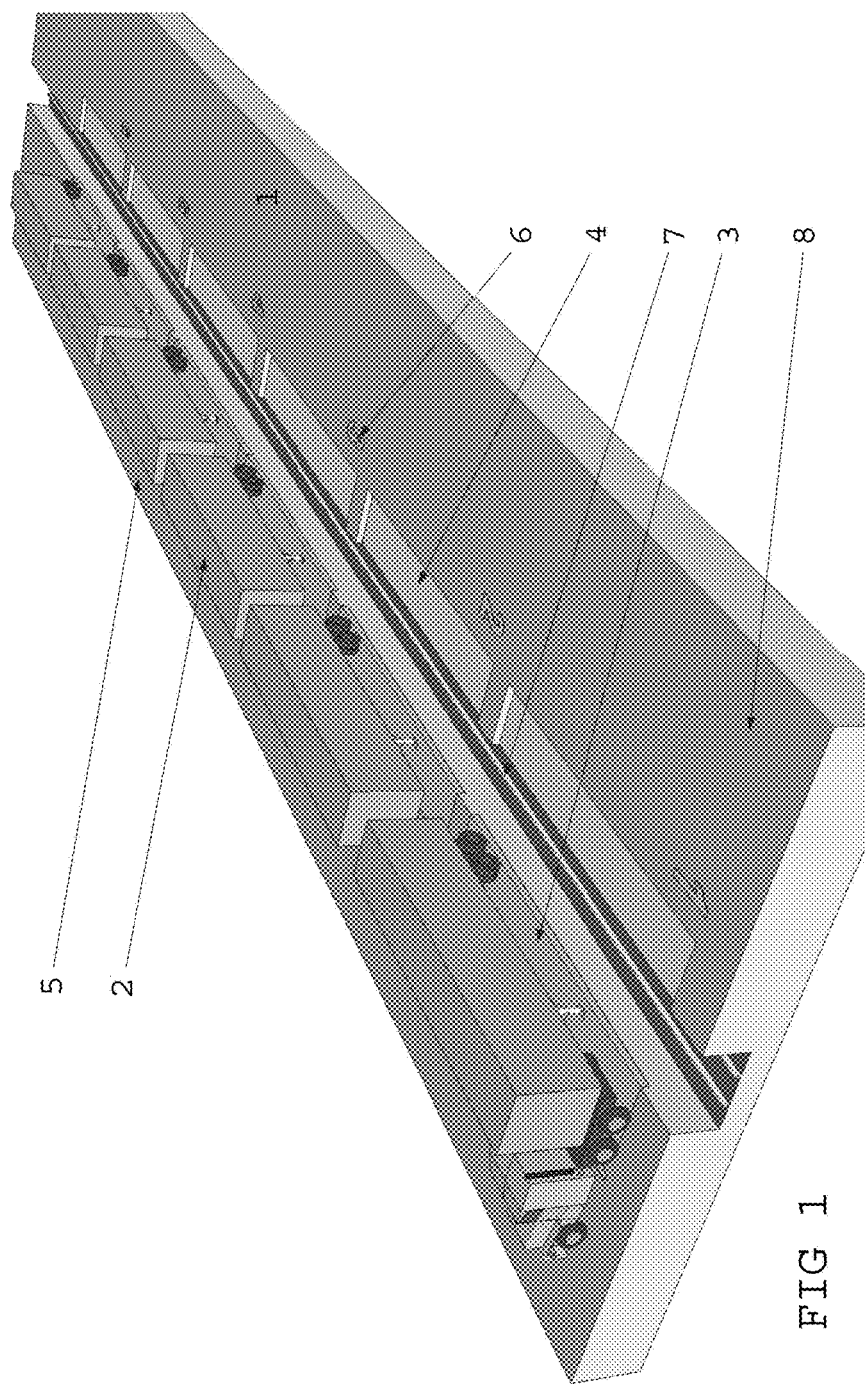
FIG. 1 Illustrates a perspective view of a rail freight terminal in which tractor hauled semi-trailers have been positioned on sleds and await loading onto railcars.

FIGS. 1-7 illustrate embodiments of the system for loading and unloading freight on railcars. FIG. 1 shows a rail freight terminal 1 having freight 2, in the form of semi-trailers. The freight is positioned by tractors on sleds 3 in loading locations within a first staging zone 5. The upper surface of the sled 3 is substantially flush with the surface of the staging zone 5 so that a tractor may access the sled and position freight thereon. Identification 6 of loading locations are displayed so that tractor operators can locate the predetermined or preassigned loading location. The freight loaded sleds may remain in the loading location until a later time. A railway 7 is located adjacent to and runs parallel with the first staging zone. The railway itself is located in a trench relative to the elevation of the staging zone so that the floor of the railcars when located on the railway will be at an elevation to allow movement of the sleds from the loading locations to the railcar. A second staging zone 8 is located on the opposite side of railway 7 relative to the first staging zone 5. The freight 2, the first and second staging zones 5 and 8, the empty loading location 4 and the loaded sleds 3 in the first staging zone 5 are each longitudinally aligned with and adjacent to the railway 7. The loading sleds move parallel to each other and perpendicular to the railway.

Figure 2:
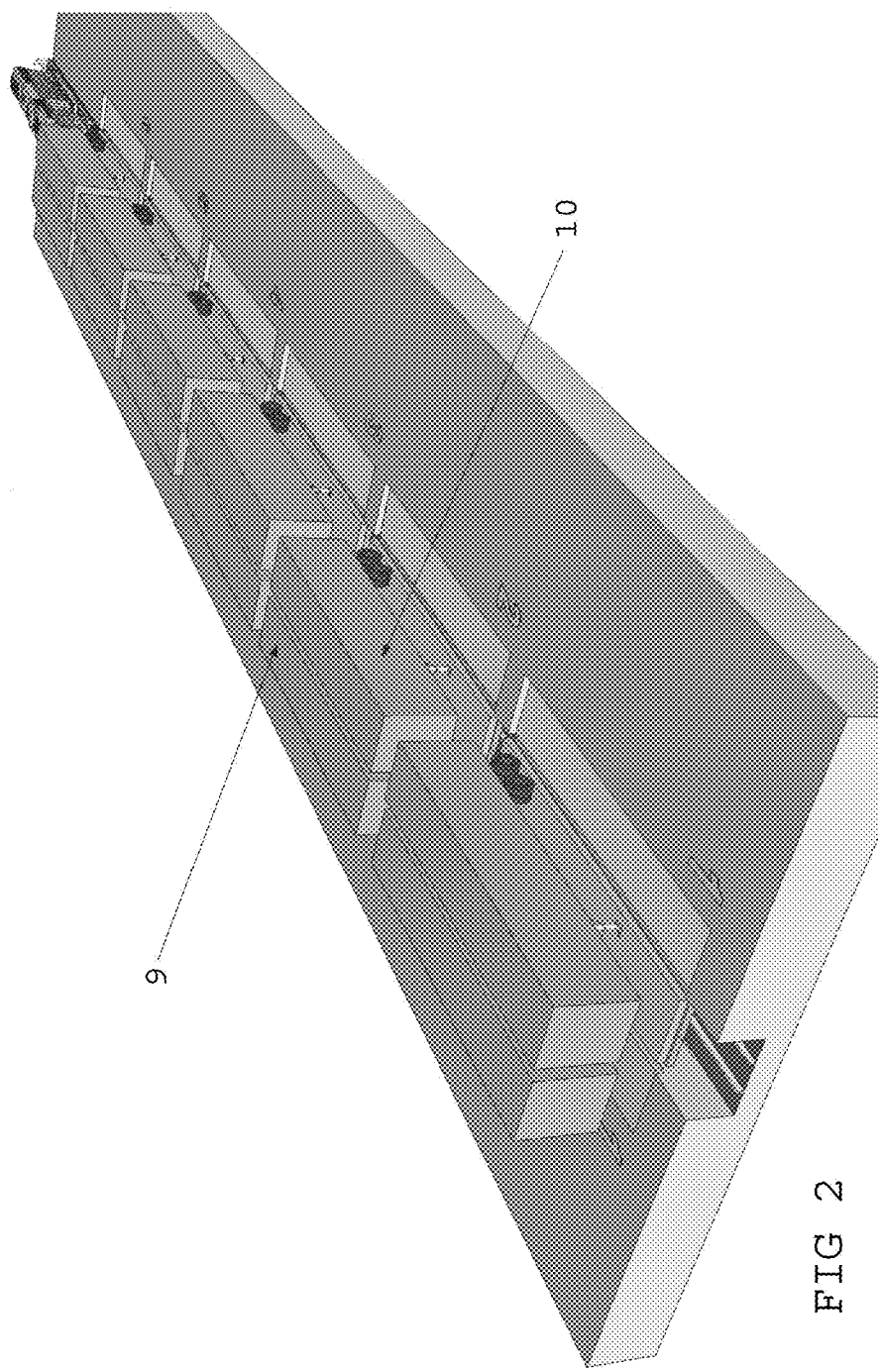
FIG. 2 Illustrates a perspective view of a rail freight terminal in which a loaded train has arrived in the terminal and is positioned adjacent to and aligned with the loading locations.

FIG. 2 shows a rail freight terminal 1 in which loaded railcars 10 have arrived in the terminal and are aligned with and adjacent to the first and second staging zones 5 and 8. A first staging zone has freight loaded sleds 9 awaiting loading. A second staging zone 8 has empty loading locations 14 ready to receive freight loaded sleds from railcars 10.

Figure 3:
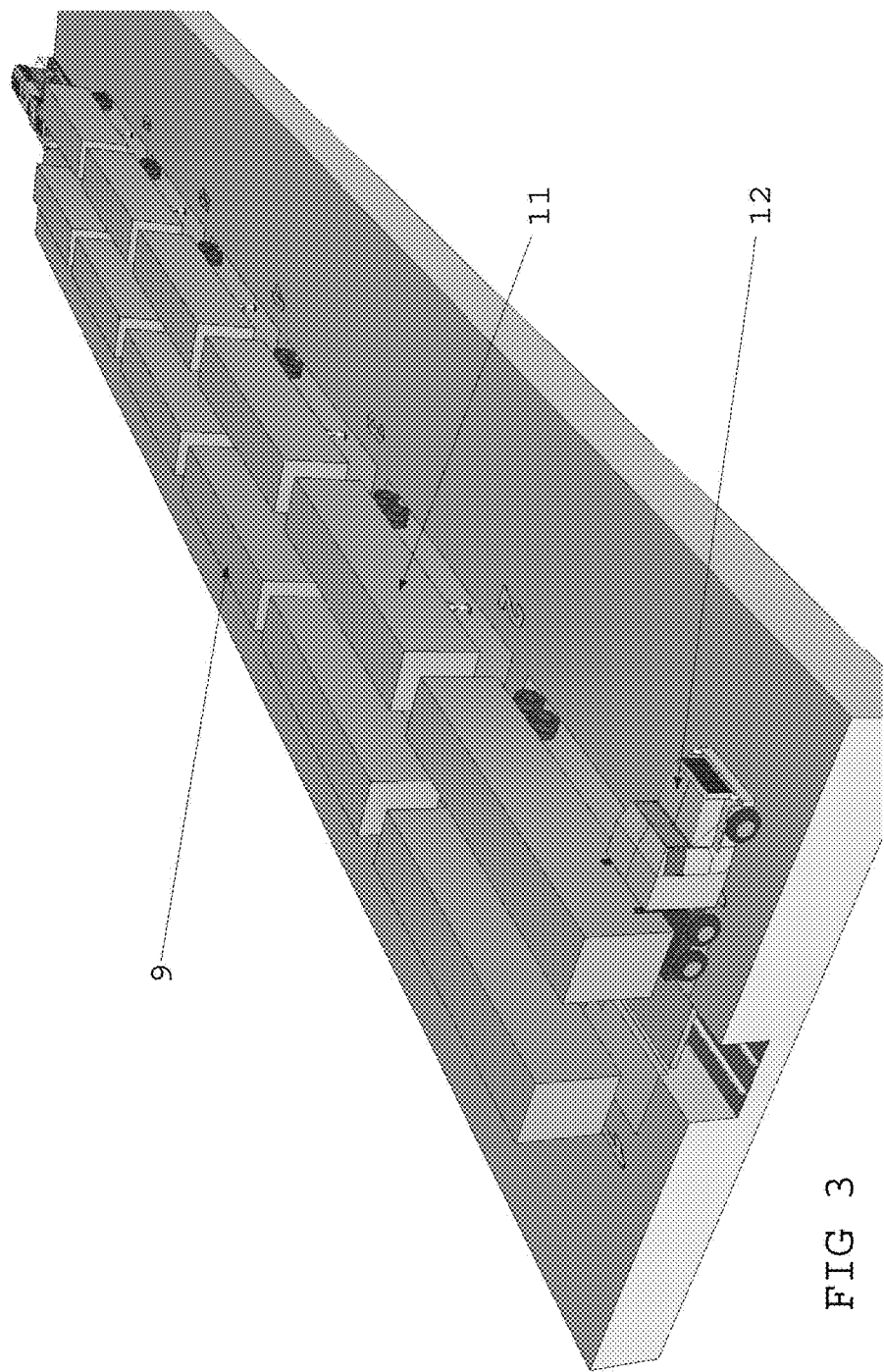
FIG. 3 Illustrates a perspective view of a rail freight terminal in which the train has been unloaded by moving the freight loaded sleds from the railcars into the empty loading locations.

FIG. 3 shows a rail freight terminal 1 in which the railcars 10 depicted in FIG. 2 have been unloaded by moving the freight loaded sleds laterally into the previously empty loading locations 4 of a second staging zone 8. The sleds may move simultaneously, individually, or in a series. The freight loaded sleds 11 in the second staging zone 8 await either tractors 12 for subsequent road transportation or a subsequent railcar for further rail transportation. Also illustrated are freight loaded sleds 9 in the first staging zone 5 ready for loading onto the now empty railcars.

Figure 4:
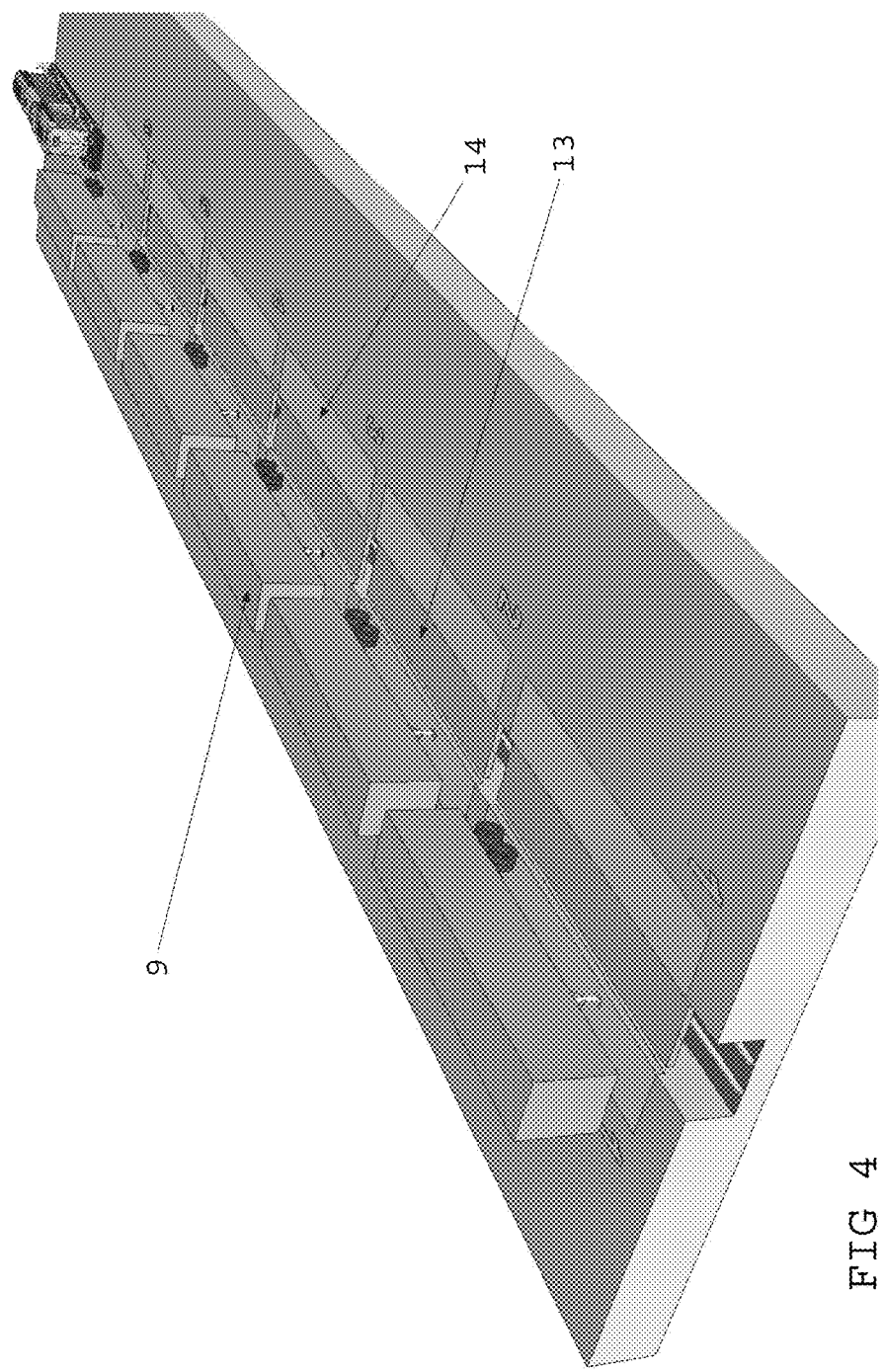
FIG. 4 Illustrates a perspective view of a rail freight terminal in which the unloaded freight has been hauled away by tractors leaving empty sleds in loading locations.

FIG. 4 shows a rail freight terminal 1 in which a vacant train awaits being loaded by the freight loaded sleds 9 in the first staging zone 5. This view illustrates that the floor of the railcar 13 is substantially at the same elevation as the loading location 4 (depicted in FIG. 1). Also, vacant sleds 14 are available for accepting freight from tractors in the second staging zone 8.

Figure 5:
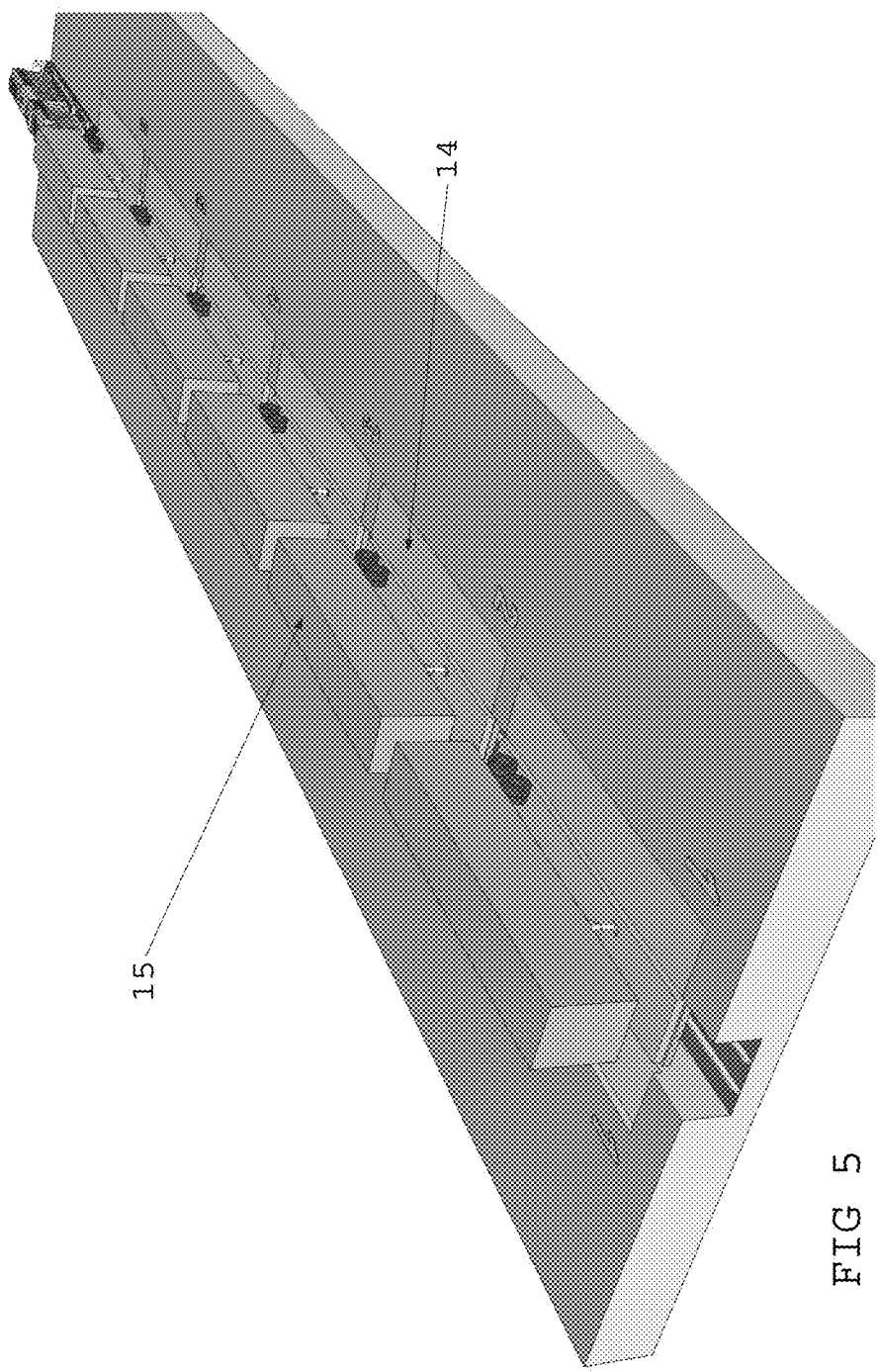
FIG. 5 Illustrates a perspective view of a rail freight terminal in which the unloaded train has been reloaded by moving the tractor hauled semi-trailers placed on sleds from the loading locations to the railcars.

FIG. 5 shows a rail freight terminal 1 with loaded railcars 15 that have been loaded by laterally moving the freight loaded sleds 9 from the first staging zone (depicted in FIG. 4) onto the railcars 13.

Figure 6:
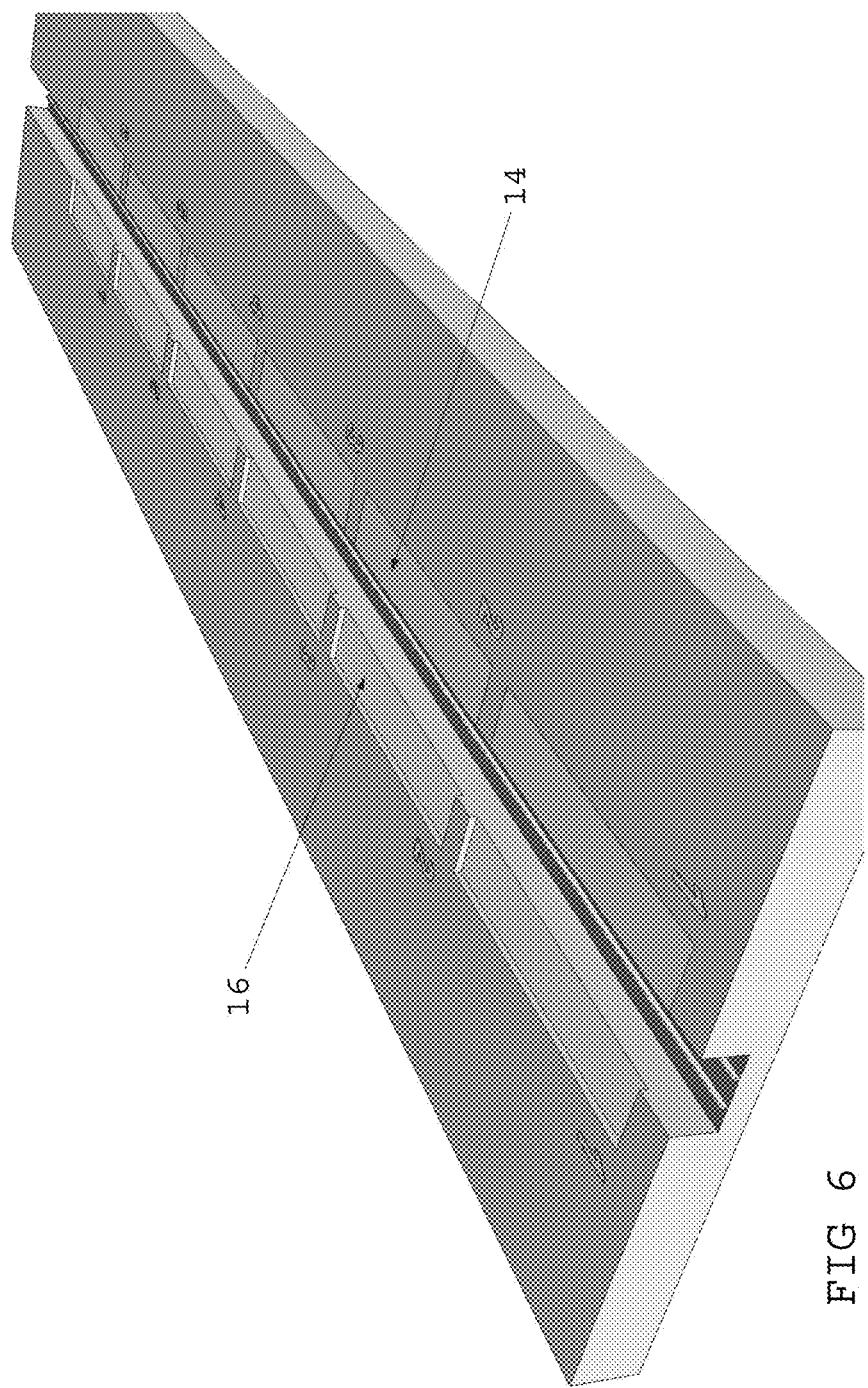
FIG. 6 Illustrates a perspective view of a rail freight terminal in which the loaded train has departed, empty loading locations are available to receive freight bearing sleds unloaded from a subsequent train and vacant sleds are available to receive freight such as tractor hauled semi-trailers.

FIG. 6 shows a rail freight terminal 1 in which a second staging zone 8 has vacant sleds 14 positioned in loading locations 4 that are available for freight 2. Also depicted is a second staging zone with empty loading locations 16 that are available for receiving freight loaded sleds.

Figure 7:
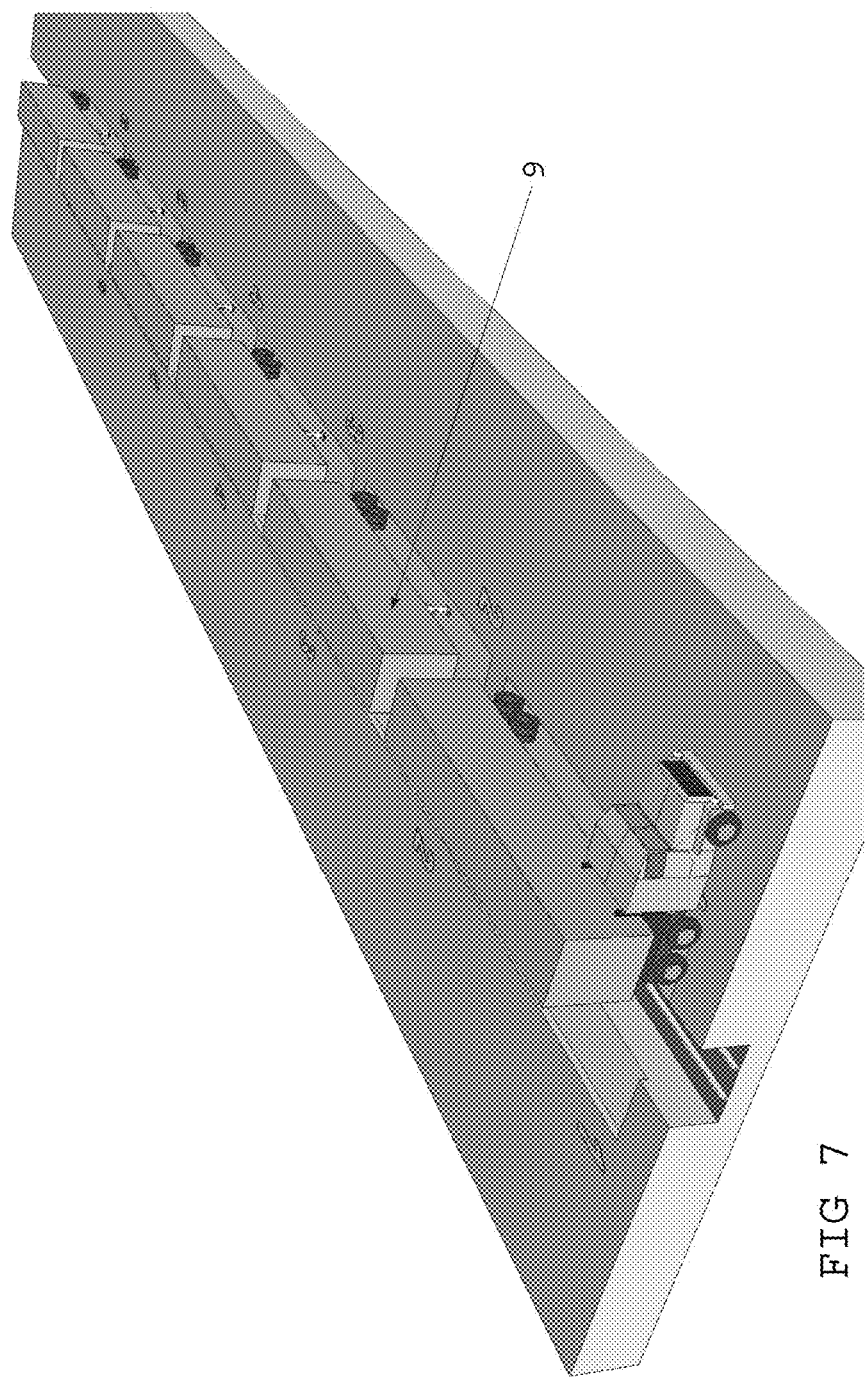
FIG. 7 Illustrates a perspective view of a rail freight terminal in which the vacant sleds have been loaded with tractor hauled semi-trailers.

FIG. 7 shows a rail freight terminal 1 in which the sleds 14 have been loaded with freight 2. The freight loaded sleds 9 are ready to be loaded onto empty railcars.

The term "freight" as used herein refers to any goods, materials or products carried by a vessel or vehicle, i.e., cargo. In a preferred embodiment, freight refers to a container, such as an intermodal container or shipping container used to transport freight between multiple modes of transportation (e.g., rail, ship, and truck), without any handling of the freight itself when changing modes. In a particularly preferred embodiment, the freight is a semi-trailer.

The term "semi-trailer" (or tractor-trailer) has its conventional meaning and is generally understood to be a trailer without a front axle. A semi-trailer may be a flatbed trailer or a skeleton chassis coupled with an intermodal freight container. Typically, a semi-trailer uses a fifth wheel coupling mechanism to connect to a tractor coupling pin, or kingpin. A semi-trailer coupled to a tractor (a towing engine, or truck) is often called a semi-trailer truck, a semi-truck, a big rig, and 18 wheeler, a Mack truck, or articulated lorry.

In one embodiment the freight optionally includes a "coded device", (tag, or smart tag) such as a radio-frequency identification (RFID) tag or transponder chip. The coded device may be programmed with or may otherwise store a record of any desired information, e.g., contents of the container, temporal information, weight, size, ownership, location and destination of the freight. This coded device may be an electromagnetic data storage device that can store, emit or receive information, or any combination thereof and is preferably field programmable. In one embodiment a programmed tag is issued to the freight by personnel at the rail freight terminal where the tag serves to identify as well as confirm receipt of the freight. Preferably, the recorded information is transmittable by electromagnetic waves and can alert at least one second party regarding the recorded or stored information via wireless transmission, such as by a wireless local area network or by radio frequency over a cellular network. A second party may be anywhere that can receive radio frequency transmissions, either directly or relayed. In one embodiment the second party is the parent company that owns the freight. In an alternative embodiment, the second party is the shipping company that is responsible for the freight transportation. In some embodiments the tag is a sensor and can track the GPS coordinates of the freight and optionally may provide additional sensor data such as temperature. The coded device may be used to assign the semi-trailer to a rail freight terminal within a staging zone for loading the semi-trailer onto a railcar. The coded devices may also be used to transmit the locations of a semi-trailer when it is placed at a loading location following transport by a railcar.

The term "railcar" as used herein to refer to any vehicle used for the carrying cargo via a rail transport system (railroad or railway). Such railcars, when coupled together and hauled by one or more locomotives, form a train. A preferred railcar for use with the inventive system is a flatcar. With the advent of containerized freight such as intermodal containers or shipping containers, special types of flatcars were designed to carry standard shipping containers and semi-trailers. All specialized flat cars known to those of ordinary skill in the art are contemplated for use with the inventive system. One such preferred railcar is a type having a depressed-center, or recessed flatcar (or "well car"). In some embodiments, a Schnabel car is also useful with the inventive system.

Railcars designed to accommodate and secure the sled of the present invention are also envisioned. The railcars for use with the invention may be equipped with roller bed surfaces to facilitate movement of sleds on and off the railcar. Rollers for forward and backward movement and rotation relative to the front and back of the railcar may also be used for proper positioning of the sled on the railcar.

The sled for use with the inventive system is not particularly limited as long as it is capable of moving laterally between a loading location and the floor of a railcar when the surfaces thereof are substantially at the same height or elevation. The freight is placed on the sled for moving between the loading location and the railcar. Preferably, the sled is capable of securely locking the freight and capable of being securely locked on the railcar so that the sled and freight are securely connected to the railcar during transportation.

In a preferred embodiment, the freight is secured to the sled and the sled is secured to the loading location when located in the loading location or to the floor of the railcar so as to form a secure temporary attachment between elements of the inventive system such as the freight, the sled and the loading location or the railcar. Such mechanisms for providing the secure temporary attachment between these elements are well known to those of ordinary skill in this art field. In one embodiment the sled is coupled to a freight using a coupling kingpin. In another example, the freight is a semi-trailer and the sled couples to a semi-trailer coupling kingpin. In another embodiment the sled is further adapted to secure the wheels of a semi-trailer loaded thereon. For example, the sled may include grooves or wells which secure the wheels.

In some embodiments of the inventive method, the step of "moving the sled" includes the step of "securing" the sled in its location, e.g., in the loading location or on the railcar. In some embodiments of the inventive method, the step of "moving the sled" includes the step of "releasing the sled" from its location e.g., in the loading location or on the railcar. In another embodiment, "moving the sled" includes rotation.

Preferably, the sled is of sufficient size and durability to bear the freight that is loaded and unloaded. In one embodiment, the freight is a semi-trailer having a length x and width y and the sled has the same or larger dimensions. Most preferably, the length of the sled is from about 1.05 to 1.5 times the length of semi-trailer and has a width in the range from about 1.05 to 1.5 times the width of the semi-trailer. Standard sizes of semi trailers are not limited to but include 27'3" (x) 100" (y), 44'1.5" (x) 93" (y), 47'3" (x) 99" (y), 52' (x) 99" (y), and 53' (x) 99" y). In one embodiment, for example, the semi-trailer has the dimensions 27'3" (x) 100" (y), then the sled can have a length (x) from 1.05×27'3" to 1.5×27'3", i.e., from 28'3½" to 40'5", and includes any length there between, e.g., 29'1", 32'8", 35'2", 38'5" and so on. The appropriate ranges for the width of the sled are similarly calculated.

The loading location of the present invention is of an appropriate size to accommodate the sled. Preferably, the loading location is formed by a recessed area in the staging zone that has the same depth as the sled is thick so that when the sled is secured in the loading location, the upper surface of the sled is substantially flush with the surface of the staging area. In this way, the loading location is accessible to tractors and the freight can be placed directly from the tractor onto the sled in the loading location. Preferably, the surface of the empty loading location (measured at the recessed surface) is at substantially the same elevation as the floor of a railcar (when the railcar is aligned with the loading location) so that the sled is easily laterally moved there between.

Figure 8:
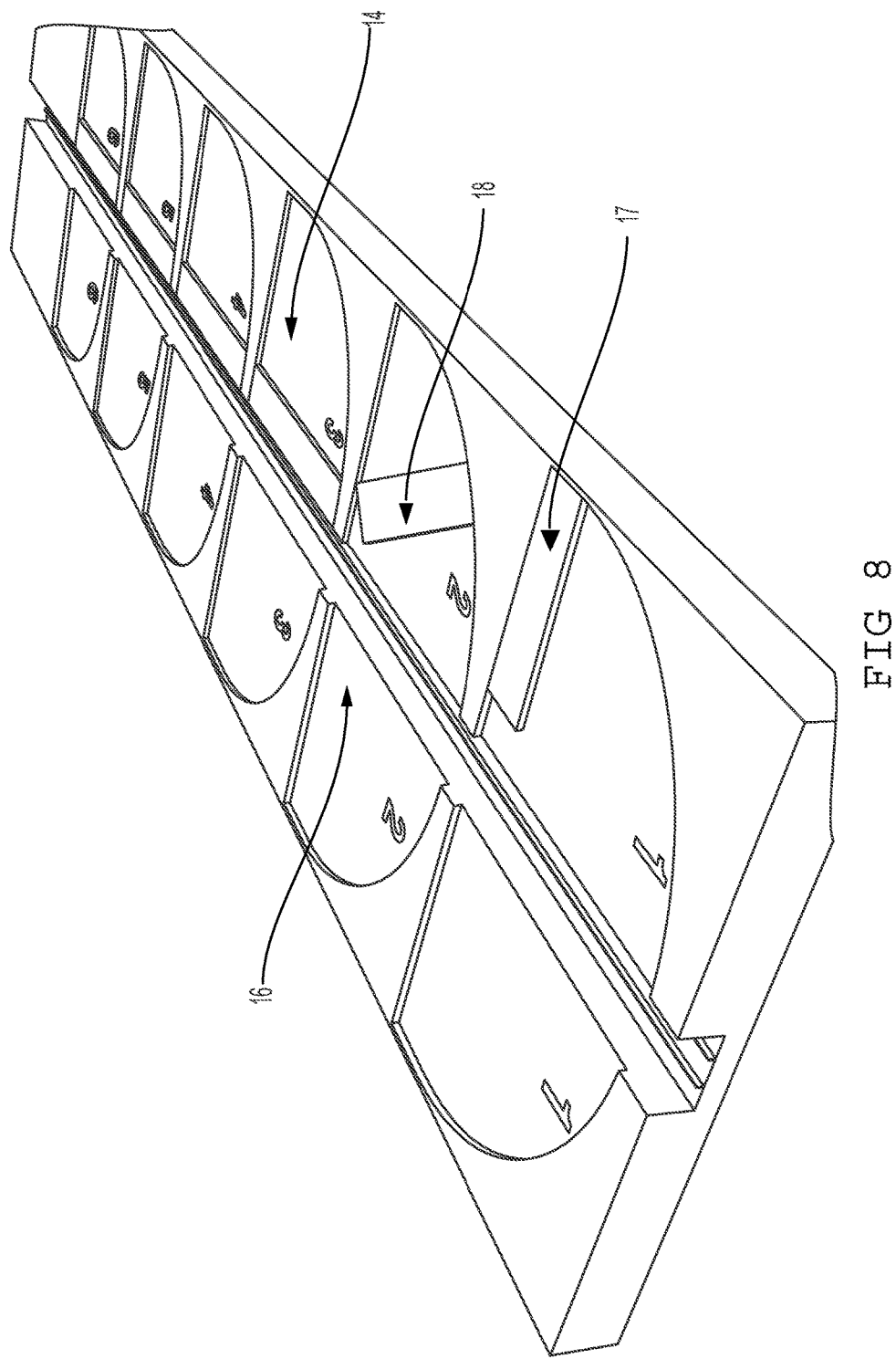

FIG. 8 illustrates a perspective view of a rail freight terminal in which a loading location 14 is adjacent to and parallel with a railway, such as the embodiment depicted in FIGS. 1-7. In this embodiment, the loading location 14 permits the sled to be in a substantially perpendicular position (17) with a railway. In a further embodiment, the loading location allows a sled located thereon to rotate in the horizontal plane such that the sled may be at any angle with respect to the railway. For example, the sled may be perpendicular to the railway (90°) or parallel to the railway) (0°) or the sled may be in a diagonal position (18) to the railway forming any angle there between, such as 5°, 10°, 12°, 15°, 20°, 30°, 45°, 50°, 55°, 60°, 65°, 70°, 75°, 80°, 85°, when measuring the acute angle formed by the railway and the length of the sled. In a particular embodiment, the sled is oriented substantially parallel with the railway when the freight is being loaded onto a railcar. In a further embodiment, sled is oriented substantially perpendicular (any angle in the range between 45°-90°, preferably between 75°-90°) to the railway when the freight is being placed on the sled. By allowing rotation of the sled, a semi-trailer or freight may be placed onto the sled in one orientation and rotated to provide convenient loading onto the railcar. In this way a driver may deposit the freight by backing onto the sled, drive away and the sled may then be rotated as necessary to allow for transfer of the freight to the railcar, e.g., from a substantially perpendicular to substantially parallel orientation with respect to the railway via rotation in the horizontal plane of the loading location. Other embodiments are envisioned that allow the orientation of the sled to be adjusted during any stage of the inventive method.

In one embodiment, a staging zone comprises one or more loading locations and provides an area that is readily accessible to a semi-tractor so that it may place the semi-trailer on the sled. In certain embodiments there are also 2, 3, 4, 5, 6, 7, 8, 9, 10, 11, 12, 13, 14, 15, 16, 17, 18, 19, 20 or more loading locations in a staging zone.

In one embodiment the railcars are positioned on a railway substantially below ground level, e.g., in a trench, and the loading locations are substantially at ground level so that the surface of the loading location and the surface of the railcar floor are substantially at the same elevation. In an alternative embodiment, the staging zone is elevated, e.g., on a platform, and the railcar is positioned on a railway substantially at ground level. In general, the surface of the loading location and the surface of the railcar floor are substantially at the same elevation so that the sled can easily move laterally from the railcar floor to the empty loading location and vice versa.

The mechanism of imparting lateral motion to the sled is readily available to those of ordinary skill in this art field. In one embodiment, the bottom surface of the sled is equipped with rollers, for example, wheels, casters and the like, that would be useful for conveying heavy loads such as loaded semi-trailers. In an alternative embodiment, the loading location and floor of the railcar are equipped with rollers that enable lateral movement of the sled between the loading location and the railcar. Any of a variety of motorized or mechanical devices may be used to move the sled. For example the sled may be independently motorized, or the sled may be pushed, pulled or propelled by an external motorized mechanism.

In the inventive method of loading and unloading freight on railcars, the freight and sled are loaded and unloaded at various rail freight terminals as necessary. The freight may be transferred from road to rail and back again in various combinations without restriction. In one embodiment, the freight loaded sled travels from a first loading location, where road hauled freight is dropped off by a first tractor, through numerous loading locations at various rail freight terminals until the freight reaches a final loading location in which a final tractor hauls the freight by road to a subsequent or final destination. In some embodiments, after initial transportation by rail, an intermediate tractor (i.e., not a first and not a last tractor) may road haul the freight to a subsequent loading location at a subsequent rail freight terminal for further rail transportation. In general, the freight may undergo various road/rail and rail/road interchanges as well as rail/rail interchanges without restriction. It is particularly preferred that the freight remain positioned on the sled while the freight is transferred via rail, regardless of how many times the freight is loaded/unloaded at various rail freight terminals.

In one embodiment, the rail freight terminal has one staging zone. In a further embodiment, the rail freight terminal includes a second, or subsequent, staging zone. There is no requisite or limitation for any particular number of staging zones to be utilized. In a preferred embodiment, tractors place freight onto a plurality of sleds in loading locations within a first staging zone. In a preferred embodiment, the second staging zone provides freight for pickup by tractors for road hauling the freight to a subsequent destination. In one embodiment, the second staging zone is on the opposite side of the railway relative to the first staging zone. In this embodiment, it is preferable that railcars are unloaded at a second staging zone and freight is loaded onto railcars from the first staging zone. In an additional embodiment, the second staging zone is on the same side of the railway relative to the first staging zone. In a preferred embodiment, the railcars at one end of the train are unloaded at a second staging zone and freight is loaded onto railcars at the other end of the train from a first staging zone. In this way, the movement of trucks dropping off or picking up freight can be coordinated within a predetermined staging zone, e.g., a road to rail staging zone or a rail to road staging zone. Also envisioned is that freight being transferred from rail to rail may be unloaded in either staging zone.

The inventive method includes the steps of placing freight on a sled capable of moving laterally between a first loading location and the floor of a first railcar that are aligned and substantially the same elevation. In some embodiments, the sled is oriented at an angle relative to the railway when the freight is being placed on the sled. In one embodiment, the tractor departs prior to the arrival of the first railcar. In another embodiment the tractor remains on the sled and is transported with the freight. In some embodiments, the placing step includes securely and reversibly attaching the freight to the sled. For example, a tractor may place freight on a sled, and then secure the freight to the sled. Optionally, the sled may be laterally moved or rotated into any angle between perpendicular and parallel relative to the roadway in order to facilitate transfer of the freight from the tractor to a sled in a loading location.

The inventive method also includes the step of laterally moving the sled and the freight from a first loading location to a first railcar. In some embodiments, lateral movement includes rotation. For example, the sled may be rotated so that the sled is in a parallel orientation with a railcar prior to moving the sled from the loading location to the railcar. In some embodiments, the sled or the surfaces of the loading location and floor of the railcar include a mechanism to provide lateral motion, optionally including rotation as one form of lateral movement. For example, the sled or the surfaces may be fitted with rollers suitable for bearing typical loads, such as semi-trucks.

In a further embodiment, the method optionally includes the steps of transporting the first railcar with the freight and sled to a subsequent destination having empty loading locations. Typically a railcar will be transported along with other railcars forming a train. Alternatively, a railcar may be independent and optionally self powered.

The inventive method also includes the step of laterally moving the sled and freight from the first railcar to a second loading location. The term "second loading location" can be considered a "subsequent loading location." There is no requisite or limitation for any particular number of loading locations to be utilized.

It is a particular advantage of the invention that a plurality of sleds may be moved between the loading locations and the railcars at or nearly the same time, thus substantially reducing the time necessary to load or unload a train of railcars with semi-trailers.

In one embodiment, the invention provides for the circumstance where the freight is transferred from the second loading location to a truck for further transportation by road, the method further includes the steps of releasing the freight from the sled in the second loading location, and transferring the freight to a tractor. In some embodiments, the sled is oriented at an angle relative to a railway when the freight is being transferred to a tractor, preferably substantially perpendicular, e.g., any angle in the range between 45°-90°, more preferably between 75°-90°. Optionally, the sled may be laterally moved or rotated into any angle between perpendicular and parallel in order to facilitate transfer from the loading location to a tractor.

In an alternative embodiment, instead of the freight being transferred to a truck for road transportation, the freight is transferred from the second loading location to a second railcar for further transportation by rail, the method includes the additional steps of laterally moving the sled and the freight from the second loading location to the floor of a second railcar; positioning the sled on the second railcar; transporting the freight to a subsequent destination having at least one empty loading location, laterally moving the sled and freight from the floor of the second railcar to a third loading location and coupling or otherwise loading the freight onto a tractor and hauling the freight by road to a subsequent or final destination. The term "second railcar" can be considered any "subsequent railcar." There is no requisite or limitation for any particular number of railcars to be utilized.

As indicated previously, there is no particular limitation on the number of loading locations or railcars or tractors that are utilized to transfer the freight using the inventive system.

All patents and patent publications referred to herein are hereby incorporated by reference in their entirety Certain modifications and improvements will occur to those skilled in the art upon a reading of the foregoing description. It should be understood that all such modifications and improvements have been deleted herein for the sake of conciseness and readability but are properly within the scope of the following claims.

The invention claimed is:

1. A method for intermodal transportation of freight on railcars, the method comprising:
    placing a semi-trailer on a sled, wherein a long axis of the sled is oriented at an angle between 45° and 90° relative to a railway, positioned in a first loading location within a staging zone having a surface for accommodating loading locations, wherein the loading location comprises a recessed surface that accommodates rotation of the sled, and wherein a sled surface for accommodating the semi-trailer is substantially flush with the staging zone surface;
    rotating the sled and the semi-trailer to a position wherein the long axis of the sled is oriented parallel relative to the railway;
    aligning a first railcar adjacent to the first loading location wherein the railcar has a surface for accommodating the sled and wherein the recessed surface of the loading location is substantially the same elevation as the surface of the railcar, and
    laterally moving the sled and the semi-trailer from the first loading location to the first railcar.

2. The method for intermodal transportation of freight on railcars according to claim 1, the method further comprising the steps of:
    aligning the first railcar adjacent to a second loading location wherein the loading location comprises a recessed surface that accommodates the sled, wherein the recessed surface of the loading location is substantially the same elevation as the surface of the railcar, and
    laterally moving the sled and semi-trailer from the first railcar to the second loading location.

3. The method for intermodal transportation of freight on railcars according to claim 2, the method further comprising the steps of:
    aligning a second railcar adjacent to the second loading location wherein the recessed surface of the loading location is substantially the same elevation as the surface of the railcar, and
    laterally moving the sled and semi-trailer from the second loading location to the second railcar.

4. The method for intermodal transportation of freight on railcars according to claim 3, the method further comprising the steps of:
    aligning the second railcar adjacent to a third loading location wherein the recessed surface of the loading location is substantially the same elevation as the surface of the railcar, and
    laterally moving the sled and semi-trailer from the second railcar to the third loading location.

5. The method for intermodal transportation of freight on railcars according to claim 2 or 4, the method further comprising the steps of:
    rotating the sled and the semi-trailer to a position wherein the long axis of the sled is oriented at an angle between 45° and 90° relative to the railway;
    coupling the semi-trailer to a tractor; and
    hauling the semi-trailer to a subsequent or final destination.

6. The method for intermodal transportation of freight on railcars according to claim 1, the method comprising:
    registering the semi-trailer at a rail freight terminal for transport;
    assigning the semi-trailer with a loading location within the rail freight terminal and programming a coded device with identification information related to the semi-trailer, and
    placing the semi-trailer on the sled in the loading location.

* * * * *